United States Patent [19]

Steinbgroever et al.

[11] 4,152,646
[45] May 1, 1979

[54] BRAKE FOR MANUALLY OPERABLE MAGNETIC THICKNESS GAUGES

[75] Inventors: Erich A. Steinbgroever, Bonn; Hans E. Nix, Cologne, both of Fed. Rep. of Germany

[73] Assignee: Elektro-Physik, Cologne, Fed. Rep. of Germany

[21] Appl. No.: 827,082

[22] Filed: Aug. 23, 1977

[30] Foreign Application Priority Data

Aug. 25, 1976 [DE] Fed. Rep. of Germany ....... 2638248

[51] Int. Cl.² ............................................. G01R 33/12
[52] U.S. Cl. ................................................... 324/230
[58] Field of Search ......................................... 324/230

[56] References Cited

U.S. PATENT DOCUMENTS

| 3,521,160 | 7/1970 | Nix et al. ................... 324/230 |
| 3,716,779 | 2/1973 | Akulov ........................ 324/230 |

FOREIGN PATENT DOCUMENTS

| 134882 | 9/1966 | U.S.S.R. ..................... 324/230 |
| 255589 | 1/1970 | U.S.S.R. ..................... 324/230 |

*Primary Examiner*—Robert J. Corcoran
*Attorney, Agent, or Firm*—Fisher, Christen & Sabol

[57] ABSTRACT

A magnetic thickness gauge having a rotatable indicator dial which is rotated to lift a permanent magnet by means of a tension spring, from the surface being measured, is provided with an automatic brake which locks the dial in place as soon as the magnet is pulled away.

7 Claims, 5 Drawing Figures

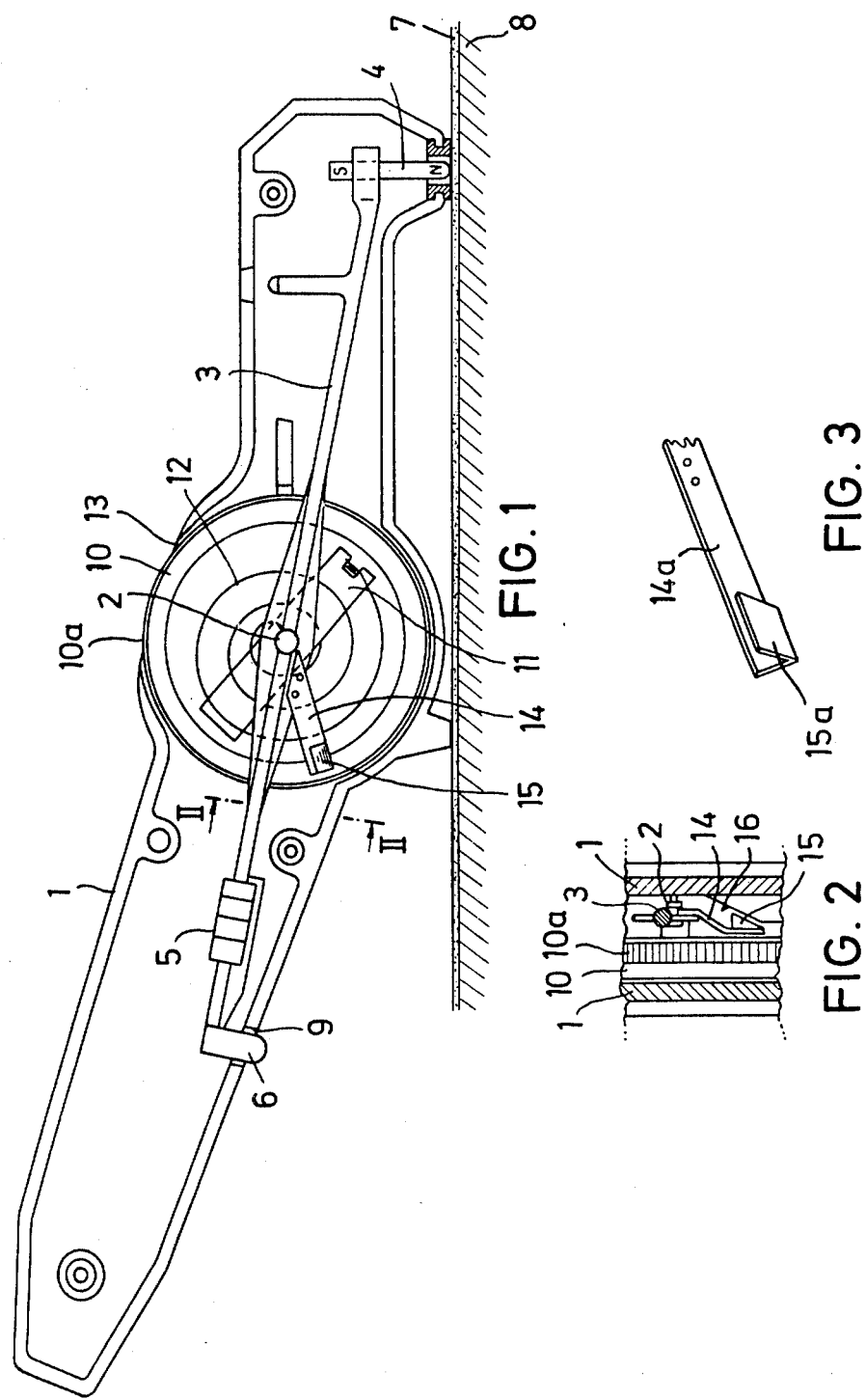

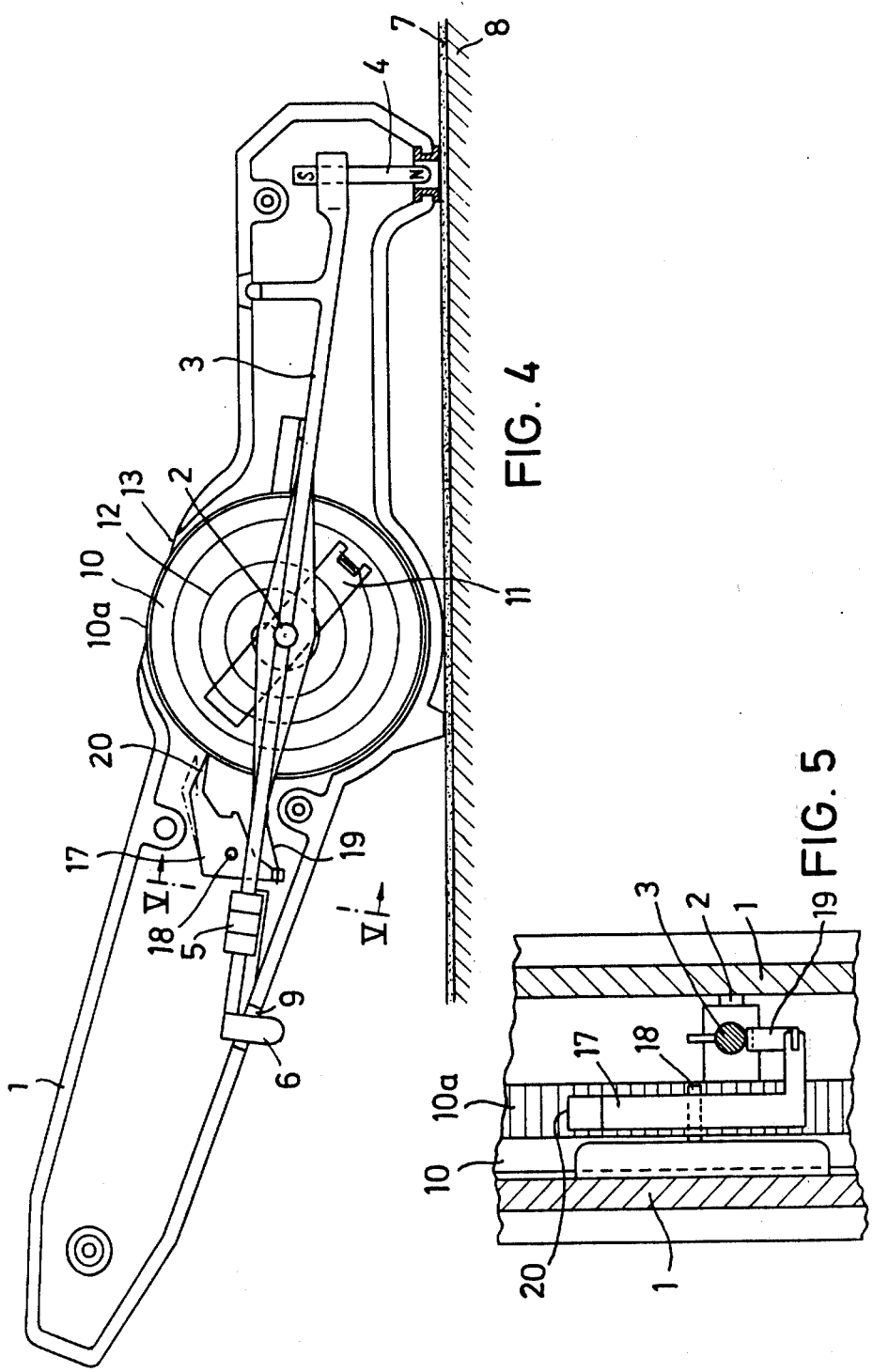

BRAKE FOR MANUALLY OPERABLE MAGNETIC THICKNESS GAUGES

This invention relates to a magnetic thickness gauge for measuring non-magnetic layers on ferromagnetic supports, wherein the attractive force of a permanent magnet arranged rotatably on a balanced arm is a measure for the thickness of the layer to be measured, and is an improvement of the device disclosed and claimed in U.S. Pat. No. 3,521,160. In gauges of this type the attractive force is measured with a spring, which is tensioned by rotation of a drive element, and a dial calibrated into layer thicknesses cooperates with an index marking provided on the housing of the device.

In known layer thickness gauges, differences of the measured thickness values are shown, but it is difficult to hold the dial perfectly still at the moment of raising the permanent magnet when the permanent magnet is to be raised from the layer to be measured by turning the dial. Since the reaction time of the measurement is not always uniform, with a plurality of measurements, deviations of the measured value occur, which cannot be easily eliminated with the devices used presently.

The object of the invention is to overcome these difficulties and to keep as small as possible the measured deviations of value which occur as a result of varying lag of the dial.

This object is obtained by providing a stop device which anchors the dial, depending upon the breaking away movement of the permanent magnet.

If it has to do with a manually controlled thickness gauge, then the stop device in a preferred embodiment is embodied as setting or braking chock connected with the balanced rotating arm between the calibrated dial and an inclined countersurface on the housing. The setting or braking chock sits on a support arm connecting with the rotating arm.

The setting or braking chock can however also consist of a flat spring which is curved into a V-shaped at its free end and is mounted on the rotating arm.

In a different embodiment of the invention, the stop device can also be embodied as a pawl with a connecting member which is flexibly attached to the rotating arm with a catch which engages by stopping in the corrugated or toothed rim of the graduated dial.

Instead of using the calibrated dial as drive disk for the movement of the rotating arm and of the permanent magnet attached thereto, a preferably battery operated electromotor can be provided for the drive.

Further individual features and advantages of the object of the invention will be shown in the following description of the embodiments shown as examples.

FIG. 1 shows a preferred form of thickness gauge according to the invention with the front housing half removed to expose the interior.

FIG. 2 shows a fragmentary cross section through the thickness gauge along line II—II of FIG. 1.

FIG. 3 is a fragmentary perspective view of a particular feature of the thickness gauge shown in FIG. 2.

FIG. 4 is a view similar to FIG. 1 of another embodiment of a thickness gauge.

FIG. 5 is a fragmentary cross section along line V—V of FIG. 4.

FIG. 1 shows a section through the hammer-shaped housing 1 of the thickness gauge, in which a rotary system is mounted with a transverse rotation axis 2. A balanced rotating arm 3 is mounted on housing 1, to swing about axis 2, at the free front end of which is mounted a permanent magnet 4, of which the poles are N and S. At the opposite end of arm 3 are found counterweights 5, for balancing the weight of permanent magnet 4.

The rotary system has a key 6 which projects out of housing 1 through a bottom opening 9 when permanent magnet 4 breaks away from the surface of the layer 7 which is to be measured, so that magnet 4 can be brought forward by finger pressure against key 6 to the surface to be measured, and the measurement can be repeated.

A calibrated dial 10 is rotatable on axis 2 in opposition to rotating arm 3, which dial is connected with arm 3 by a finger 11 which is resiliently connected to it and a coil spring 12 attached thereon. Dial 10 extends at its top edge through the area of a housing opening 13 and slightly beyond the outside edge of housing 1, so that it can be rotated by hand.

The movement of the rotary system occurs over the dial 10, which has an exposed corrugated, or toothed rim 10a in the area of housing opening 13 and tensions coil spring 12 through finger 11, which spring is mounted on the rotation axis 2 of the rotary system. Finger 11 can be rotated from the outside with respect to dial 10 in a known manner by a bushing which also serves as support for the rotary system, so that the zero point of the scale can be brought into accord with the breakaway point of permanent magnet 4 from an uncoated ferromagnetic support.

A support arm 14 projects rearward from arm 3 and is attached to its side, and supports a setting or braking chock 15 at its free end, which can be set so that it drops, when permanent magnet 4 is raised from the measured surface, into a wedge-shaped braking slot between dial 10 and an inclined countersurface 16 on housing 1, and holds dial 10 still momentarily.

After reading the measured value, dial 10 can be rotated back again, so that braking chock 15 with its arm 3 is again freed and a new measurement can be carried out.

As shown in FIG. 3 instead of a solid braking chock 15, a downward inclined plate spring 14a with its free end bent into a V-shape 15a can be provided, which engages and holds in the wedge-shaped braking slot between dial 10 and countersurface 16 in place of the chock.

As shown in FIGS. 4 and 5, instead of the setting or braking chock 15, or 15a a pawl 17 can be provided supported rotatably at its center of gravity on an axis 18, which pawl engages with a bottom plate spring operating the same as flexible connection member 19 on the underside of the balanced arm 3, and has a catch 20 directed against dial 10, which engages in the corrugated or toothed rim 10a of dial 10 with raising of permanent magnet 4 from the measure surface by rotation of pawl 17 essentially radially, and momentarily prevents any further rotation of the dial.

What is claimed is:

1. An indicator brake for the manually operable actuator of a thickness gauge of the type wherein the attractive force of a permanent magnet pivotally mounted in a housing on a balanced arm provides a measurement of the thickness of a non-magnetic layer applied to a ferromagnetic support, said actuator being rotatably mounted in the housing coaxially with said balanced arm, indicia means comprising two elements, one of which is fixed directly to the actuator, the other being fixed directly to the housing during operation and being calibrated in terms of the thickness of a layer to be measured, spring means connecting said actuator to said balanced arm to urge said magnet away from said layer in response to rotation of the actuator in one direction, said brake comprising a member reciprocatorily mounted in said housing and movable in response to movement of the magnet away from said layer to a position in direct contact with said actuator to resist further movement in said one direction and to transmit the force of said resistance to the housing independently of the pivotal mounting of the balanced arm.

2. An indicator brake as claimed in claim 1, wherein said magnet is mounted on a balanced arm system pivotally supported by said housing and said braking means comprises an element mounted for movement with said balanced arm, said element being provided with a wedge-shaped surface which coacts with a complementary surface on the housing and a surface of said dial for stopping said further rotation.

3. An indicator brake as claimed in claim 2, wherein said element comprises a flat spring having a V-shaped end portion to define said wedge-shaped surface.

4. An indicator brake as claimed in claim 2, wherein said balanced arm system includes a first arm for supporting said magnet, and a second arm, said element having a wedge-shaped surface being mounted at the free end of said second arm.

5. An indicator brake as claimed in claim 4, wherein said second arm comprises an elongated flat spring, the free end thereof being V-shaped in cross-section to define said wedge-shaped surface.

6. An indicator brake as claimed in claim 1, wherein said magnet is supported by a balanced rotary system, said braking means comprising a pawl rotatably mounted in said housing, said pawl including a projecting tooth for braking engagement with a surface of said dial and a resilient member for engagement with an element of said rotary system to actuate said pawl.

7. An indicator brake as claimed in claim 6, wherein said pawl is rotatable about an axis concentric with its center of gravity and parallel with the axis of said rotary system, said tooth being engageable with a peripheral surface of said dial.

* * * * *